United States Patent
Henzler

(10) Patent No.: US 7,410,333 B2
(45) Date of Patent: Aug. 12, 2008

(54) HAND TOOL

(75) Inventor: Adolf Henzler, Nürtingen (DE)

(73) Assignee: GL GmbH Metall- und Werkstattechnik, Frickenhausen Baden-Wuerttemberg (DE)

( * ) Notice: Subject to any disclaimer, the term of this patent is extended or adjusted under 35 U.S.C. 154(b) by 0 days.

(21) Appl. No.: 11/587,679

(22) PCT Filed: Apr. 12, 2005

(86) PCT No.: PCT/EP2005/003817

§ 371 (c)(1),
(2), (4) Date: Jan. 30, 2007

(87) PCT Pub. No.: WO2005/107985

PCT Pub. Date: Nov. 17, 2005

(65) Prior Publication Data

US 2007/0147970 A1 Jun. 28, 2007

(30) Foreign Application Priority Data

Apr. 29, 2004 (DE) .................. 10 2004 021 134

(51) Int. Cl.
*B23C 1/20* (2006.01)
*B23C 5/10* (2006.01)
(52) U.S. Cl. .................. 409/180; 144/136.95
(58) Field of Classification Search .............. 409/174, 409/175, 180, 181, 182, 185; 144/136.95, 144/154.5; 408/241 G
See application file for complete search history.

(56) References Cited

U.S. PATENT DOCUMENTS

| 2,635,655 | A | * | 4/1953 | Linstead | 144/134.1 |
|---|---|---|---|---|---|
| 3,212,541 | A | * | 10/1965 | Burrows et al. | 144/134.1 |
| 3,285,135 | A | * | 11/1966 | Shaw | 409/180 |
| 3,494,395 | A | | 2/1970 | Graham | |
| 3,874,810 | A | * | 4/1975 | Russell | 408/14 |
| 4,242,016 | A | * | 12/1980 | Faris | 408/14 |
| 4,585,376 | A | * | 4/1986 | Davenport et al. | 408/110 |
| 4,608,291 | A | * | 8/1986 | Gove | 428/119 |
| 4,655,653 | A | | 4/1987 | Hall et al. | |
| D291,528 | S | * | 8/1987 | Degen | D8/71 |
| 4,827,996 | A | | 5/1989 | Cotton et al. | |
| 4,952,159 | A | | 8/1990 | Fukuda et al. | |
| 4,988,245 | A | * | 1/1991 | Fukuda | 409/178 |
| 4,993,897 | A | * | 2/1991 | Anderhalden | 409/180 |

(Continued)

FOREIGN PATENT DOCUMENTS

DE 3900506 A1 7/1989

(Continued)

*Primary Examiner*—Dana Ross
(74) *Attorney, Agent, or Firm*—Leydig, Voit & Mayer, Ltd.

(57) ABSTRACT

The invention relates to a milling tool (1) for opening laser welded connections between thin metal sheets. The milling tool includes a rotary drive (2), which is used to operate a milling cutter (9). The head of the milling cutter (9) protrudes through an opening (28) in a base plate (4) that forms an even contact surface (25) for defining the penetration depth of the milling cutter head in the material. In addition, the base plate (4) is provided with a lateral contact surface or contact edge (27) that introduces the reaction force, which originates from the cutting force, directly and rapidly into a contact surface of the bodywork section that is to be treated.

32 Claims, 3 Drawing Sheets

U.S. PATENT DOCUMENTS

| | | | |
|---|---|---|---|
| 5,013,195 A | | 5/1991 | Strazar |
| 5,028,179 A | * | 7/1991 | Grasset ........................ 409/180 |
| 5,150,993 A | * | 9/1992 | Miller ......................... 408/110 |
| D353,314 S | * | 12/1994 | Jaslow ........................... D8/70 |
| 6,027,289 A | | 2/2000 | Posh |
| 6,244,796 B1 | * | 6/2001 | Schuebel et al. ............. 409/180 |
| D474,093 S | * | 5/2003 | Chang ........................... D8/71 |
| D499,002 S | * | 11/2004 | Troxell .......................... D8/70 |
| 7,029,212 B2 | * | 4/2006 | Adkins et al. ................ 409/180 |
| 7,131,898 B2 | * | 11/2006 | Adkins et al. ................ 451/360 |
| 7,214,013 B2 | * | 5/2007 | Ferrari et al. ................ 409/137 |
| 2003/0002946 A1 | | 1/2003 | Hsieh |
| 2004/0208719 A1 | | 10/2004 | Adkins et al. |
| 2004/0240956 A1 | * | 12/2004 | Bernardi et al. .............. 409/137 |
| 2005/0002747 A1 | * | 1/2005 | Adkins et al. ................ 409/180 |
| 2005/0081954 A1 | * | 4/2005 | Wielechowski ........ 144/136.95 |
| 2006/0260716 A1 | * | 11/2006 | Smith et al. ............... 144/154.5 |

FOREIGN PATENT DOCUMENTS

| | | |
|---|---|---|
| DE | 8907514.5 U1 | 8/1989 |
| DE | 8907514 U1 | 8/1989 |
| DE | 9417415.6 U1 | 12/1994 |
| EP | 0609174 A1 | 8/1994 |
| EP | 0830923 A | 3/1998 |

* cited by examiner

HAND TOOL

BACKGROUND OF THE INVENTION

The car bodies of modern automobiles have a multiple-layer construction made from thin sheets. The thin sheets meet each other in the area of door cutouts, window cutouts, wheel wells, fenders, and the like. In these locations, flanges that lie flat against each other are bent on the corresponding parts. To join these flanges with each other, a spot-welding technique has been used in the past. This technique involves a resistance welding method, in which the thin sheet-metal parts are welded to each other in the area of a small circle. For repairs, these point-shaped weld spots can be opened with the help of a drill. The drill has a tip and cutting ends that enclose an angle of 190°.

With the development of laser welding, the spot-weld joints in car bodies have been increasingly replaced by laser-welded joints. For a laser weld joint, the beam is guided so that it fuses the sheet-metal parts to be joined together along a narrow line, with the sheet-metal parts are welded to each other in the area of this line. The seam can follow a complicated path and the direction for a straight seam is selected, in particular, based on considerations of strength and optimal path. Thus, a seam will not necessarily lie parallel to the lock seam of the relevant car-body part or to the edge of the flange.

Such weld joints can present significant problems when a car-body part must be replaced due to accident damage. In the past, attempts have been made to open these laser-welded seams with the help of hand-operated grinding tools, for example, right-angle grinders. Grinding tools exhibit a relatively small and relatively constant reaction force, so that they are easy to operate by hand. However, these tools produce very fine ground dust made from oxidized and non-oxidized steel, which can be a significant source of contamination in the environment, the vehicle, and the factory. The ray of sparks that is produced during these grinding operations cannot be easily shielded and can also damage the inner lining of the vehicle.

BACKGROUND OF THE INVENTION

In view of the foregoing, a general object of the invention is to provide a hand-operated, self-powered tool with which laser-welded joints between thin sheets can be opened without the risk of a large amount of contamination.

With hand-operated, self-powered tool according to the invention, a milling cutter is used as the active part engaging the thin sheet, instead of a grinding tool. The milling cutter runs at low rotational speed and generates relatively large scrap shavings, which do not fly very far and which can be removed easily. There is little risk that the produced shavings will burn into the cushioning or the inner lining of the vehicle. The milling tool sits in the casing of a rotary drive that rotates the tool.

To uniquely guide of the milling cutter when it is engaged with the sheet, a foot plate is provided that features a contact surface and a guide edge. The contact surface and the guide edge are located in the immediate vicinity of the milling cutter. The reaction forces that are produced, which can fluctuate very widely under some circumstances, can be introduced into the car body directly from the foot plate. In this case, the penetration depth of the tool is regulated with the help of the contact surface, while the worker has the ability to guide the milling cutter via the edge along the course of the laser-welded seam. The guide edge can be supported either in the lock seam or on the free edge of the car-body part or flange according to the construction of the footplate.

Because the reaction force produced by the cutting force is introduced close to the milling cutter itself, small lever arms are defined, which can be compensated without additional measures by the worker when he holds the rotary drive in his hands. Abrupt changes in the reaction forces are also dampened for these lever ratios, in which even the center of gravity of the rotary drive has a large lever arm compared with the lever arm of the guide edge. This unburdens the worker in that he does not have to react to abrupt changes to the reaction force. The quality of the milled weld seam is accordingly high. In particular, large amounts of material are not removed unnecessarily.

With the guide edge, the worker can guide the milling cutter arbitrarily in terms of the path to be milled. In this respect, the tool needs no additional guide devices for controlling the movement along the weld seam.

Because the rotational axis of the rotary drive is inclined relative to the contact surface defined by the guide plate, the rotary drive itself can be used as a handle for the tool. Additionally, the free space necessary to be able to work the inventive tool into areas of a car-body cutout with small radii of curvature, as is the case, for example, for the corner areas of window cutouts, is created.

The contact surface is preferably a flat surface, which eliminates the risk of tipping that could cause varying penetration depth into the sheet by the milling cutter. The guide edge can define the contact surface on one side and can extend from the contact surface in the direction towards the side of the footplate adjacent to the rotary drive. With such an embodiment of the footplate, the guide edge is guided in the area of the internal corner or channel of a lock seam. In this way, the guide edge can also be rounded when it merges into the contact surface, so that the contact point of the guide edge with the car-body sheet is displaced outwards from the area of the curvature of the lock seam. It is also possible for the guide edge to have a certain spatial separation from the contact surface in the vertical direction, although it is connected directly to the footplate. Such a solution should also be possible using a configuration in which the guide edge defines the contact surface on one side.

Weld seams located in the corner area of a car-body cutout can present problems when the guide edge lies on the side of the rotary drive. The guide edge is also not to be used on the side of the rotary drive when work must be performed at a position of the car body that does not have an internal corner. In such cases, a footplate is preferably used in which the guide edge is lifted from the plane defined by the guide surfaces in a direction pointing away from the drive source. In other words, the rotary drive can be located on one side of the footplate and the guide edge can be arranged on the other side of the footplate. Such a guide edge stops, for example, at a simple bolt that projects from the contact surface.

The guide edge can be a curved edge, for example, with a changing radius of curvature. In this way, the position of the milling cutter can be regulated relative to the reference edge without additional measures by rotation about axes at a right angle to the contact surface. In each case, the reaction force is introduced directly into the car body via the guide edge.

Very favorable work conditions are produced when the rotational axis is inclined by a generally acute angle relative to the plane defined by the contact surface. The intersection point between the rotational axis and the contact surface plane lies on the other side as compared to the rotary drive relative to the holder.

Preferably, a spherical cutter, i.e., a milling cutter with a cylindrical shaft and a spherical cutting head is used as a milling cutter for the hand-operated tool of the invention. This cutting head tends to not get caught in the thin sheet metal even when turned in the plane of the footplate in order to change the distance of the milling cutter from the outer edge or the internal corner of the car-body part.

A compressed-air motor or an electric motor can be used as the rotary drive. In this case, compressed air motors are preferred over electric motors in that they are lighter; however they require a somewhat more expensive energy source.

To generate sufficient cutting speed, the milling cutter is preferably coupled directly to the armature shaft or the rotor of the compressed air motor. In addition, this arrangement has the advantage of saving a lot of space in the area of the milling cutter, so that work can be performed with short clamping lengths. This, in turn, increases the stiffness or vibration resistance of the entire arrangement.

A particularly advantageous and stable connection of the rotary drive to the footplate can be achieved when the rotary drive has an attachment neck coaxial to the casing. The attachment neck can be provided with a cylindrically smooth surface or with an external thread.

The milling depth can be regulated by either shifting the rotary drive along the rotational axis or changing the angle of the rotational axis relative to the footplate.

Advantageously, the footplate sits on a holder, which connects the footplate to the rotary drive. This holder can have an articulated joint for regulating the milling depth.

In the case of a neck provided with threads, the holder has a threaded bore so that the milling depth can be adjusted by screwing the holder back and forth on the neck of the rotary drive. The set screw depth can be fixed with the help of an optional clamping device.

By reading the description of the figures, it will become clear to someone skilled in the art that a series of modifications is possible, which do not have to be described explicitly.

DETAILED DESCRIPTION OF THE INVENTION

Figure 1:
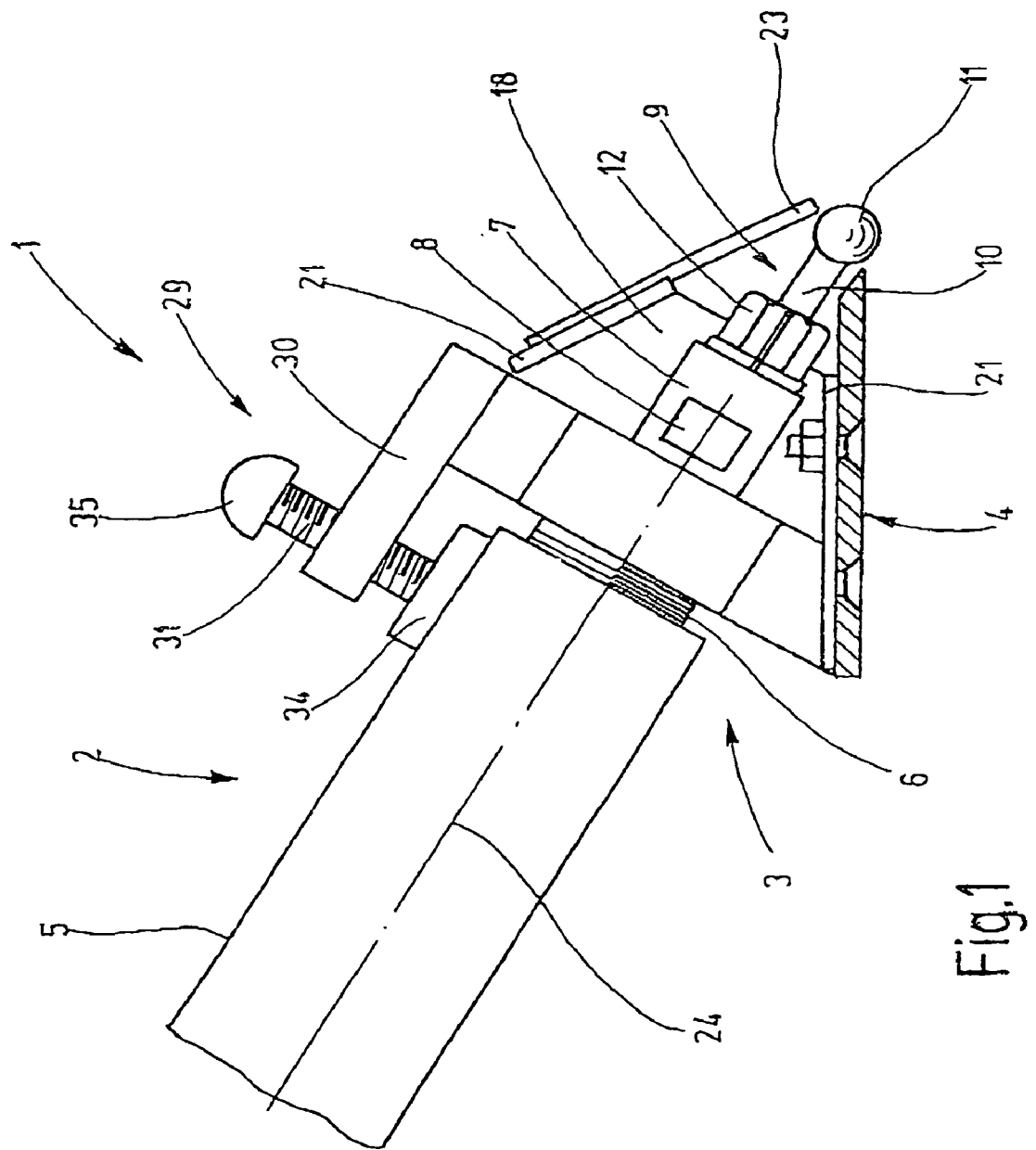
FIG. 1 is a schematic side view of an exemplary tool according to the invention.
Figure 2:
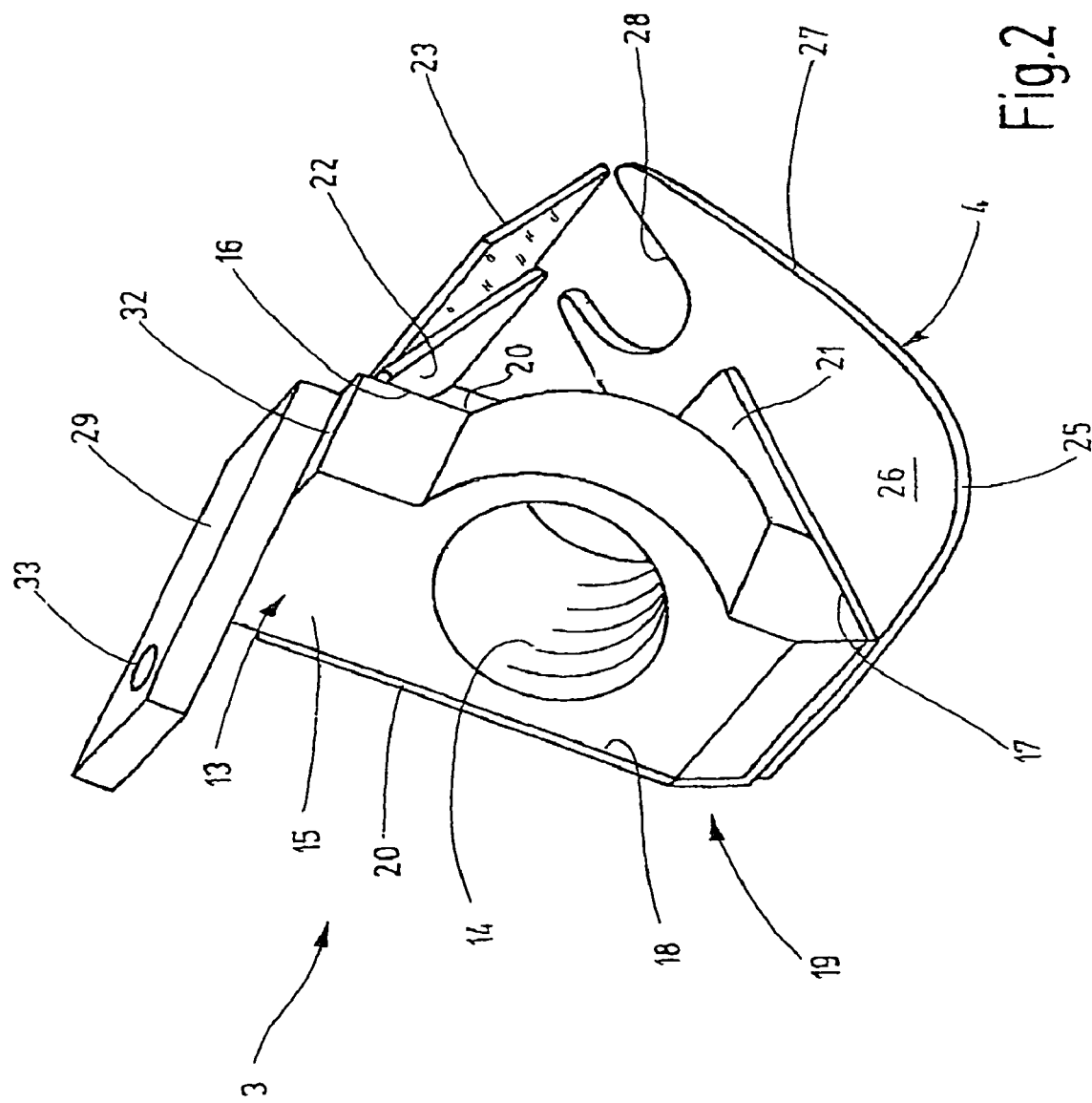
FIG. 2 is an enlarged perspective view of the holder of the tool of FIG. 1.

Referring to FIG. 1 of the drawings, a hand-operated tool is shown that is designed for opening laser-weld seams on car bodies. The tool 1 includes a rotary drive 2, a holder 3, which is shown in FIG. 2, and a footplate 4.

The rotary drive 2 comprises an electric motor or a compressed air motor with a housing 5 used as a handle, in which the actual drive device is held in a known way. The housing has an outer diameter of ca. 3-4 cm and can be gripped without additional measures by hand, in order to function as a handle. The housing has a neck 6 at the front end that carries an external thread. A bearing device for a shaft 7 is arranged within the neck 6 and projects out of the housing 5 through the neck 6. When a compressed air motor is used, the shaft 7 comprises a shaft supporting the rotor of the compressed air motor. The shaft 7 is provided with a double edge 8 for a wrench.

The shaft 7 is coupled directly to a spherical cutter 9 that includes a cylindrical shaft 10 and a spherical cutting head 11. The cylindrical shaft 10 plugs into a collet chuck 12 that screws into a threaded pocket hole of the drive shaft 7. The collet chuck casing 12 is provided with an external hexagon for a wrench.

The holder 3 is used for connecting the rotary drive 2 to the footplate 4. The holder 3 has a base 13 with a threaded through hole 14, which starts from a plane surface 15 and in which the threaded neck 6 can be screwed as shown in FIG. 1. On the side opposite the plane surface 15, the base 13 is defined by another plane surface 16 that is parallel to the surface 15. The base 13 has an attachment surface 17 on the bottom side that is aligned at an angle to the two plane surfaces 15 and 16. On side facing away from the viewer in FIG. 1, the base 13 carries a plane surface 18 that is aligned at a right angle to the surfaces 15 and 16. The plane surface 18 is used as a contact surface for an essentially U-shaped brace part 19, which is screwed with its back 20 onto the side of the base 13 of the holder 3 facing away from the viewer of FIG. 1. One of the two legs 21 contacts the surface 17 of the base 13. The other leg 22 is also at a right angle to the back 20 but at an angle to the let 21. The other leg 22 is used as a carrier for a transparent cuttings protective plate 23.

To improve the view onto the milling cutter 9, the base 13 is not formed as a square part, but instead the holder 3 is cambered in the area of the threaded bore 14 on the side facing the viewer of FIG. 1. Above and below the camber, which follows the contours of the bore 14, the base 13 is narrower than in the region of the bore 14 (measured in the transverse direction).

With the flange 21, the brace part 19 lies between the base 13 of the holder 3 and the footplate 4 and is used to stiffen or to brace the connection between the base 13 and the footplate 4 via the back 20, which projects in the direction towards the milling cutter 9 past the base 13.

According to the alignment of the axis of the bore 14 relative to the attachment surface 17, the axis of the bore 14 extends in the direction towards the footplate 4, such that the plane formed by the footplate 4 and the axis converge in the direction away from the rotary drive 2. The angle connecting the bore 14 to the footplate 4 equals approximately 20°-45°, i.e., around 30°. The axis of the bore 14 also fixes the rotational axis of the milling cutter 9, which is shown in FIG. 1 with dash-dot lines and is referenced with number 24.

In the illustrated embodiment, the footplate 4 is essentially a plane parallel plate that is defined by a flat bottom side 25, a flat top side 26, and a contoured edge 27. The footplate 4 is screwed tight to the base 13 and also to the flange 21 with screws that are not shown in more detail. In the area in front of the holder 3, where the rotational axis 24 intersects the plane of the footplate 4, the footplate 4 is provided with an opening 28, which is open in the direction away from the holder 3. The footplate 4 has a shape that is relatively wide in the area where the holder 3 is connected to the footplate 4. The footplate becomes increasingly narrower starting from the area of the holder and extending in the direction towards the slot or the mouth-shaped opening 28. On the side away from the viewer of FIG. 1, the footplate 4 is cut straight. The edge has no bearing on the work performed. The guide edge 27 runs more or less offset relative to the projection of the rotational axis 24 onto the footplate 4.

To fix the screw-in position of the rotary drive 2 relative to the holder 3, a clamping device 29 is provided. The clamping device 29 is composed of an arm 30 and a screw spindle 31. The arm 30 is screwed tight to the base 13 on its top side at a surface 32 facing away from the attachment surface 17 by means of screws that are not shown in more detail. The arm 30 projects over the plane surface 15 in the direction towards the rotary drive 2 and runs over the center of the rotational axis 24. At a distance from the plane surface 15, the arm 30 contains a threaded bore 33, through which the spindle 31 extends. This spindle is provided below the arm 30 with a clamping plate 34 and on the opposite side with a locking bolt 35.

The handling of the illustrated hand-operated tool is as follows: After the milling cutter 9 is mounted in the collet chuck 12 in the illustrated manner, the holder 3, which is provided with the footplate 4, can be screwed onto the threaded neck 6. The holder is screwed on until the spherical cutting head 11 extends past the bottom contact surface 25 of the footplate 4 by the desired cutting depth. This surface is a flat surface. The milling cutter 9 is located within the opening 28, with the footplate 4 giving support on both sides of the cutting head 11.

At the desired set depth, with the help of the locking bolt 35, the screw spindle 31 is turned far enough until the plate 34, which is optionally provided with an elastomer layer, achieves a tight connection with the cylindrical housing 5 and prevents further rotational movement. The tool 1 is adjusted in this way. The worker can now set the tool in a lock seam in the car body. In a known way, such a lock seam is defined by an upright wall and a surface or flange extending, for the most part, approximately at a right angle to the upright wall and in which the weld seams are formed. The upright wall is used as a guide surface in order to absorb the reaction force.

The worker positions the tool according to the invention such that the cutting head 11 is located over the linear weld seam to be milled, while the guide edge 27 is guided on the projecting wall of the lock seam. By turning the tool 1 in the plane of the footplate 4, the distance of the cutting head 11 from the projecting wall of the lock seam can be set. In this case, the guide edge 27 rolls on the projecting part of the internal corner of the lock seam according to the pivoted position.

It is not difficult to understand that the cutting head moves to an ever greater distance from the internal corner the greater the rotary drive 2 functioning as a handle is pivoted in the direction towards the internal corner of the lock seam. The contact point between the projecting wall of the lock seam and the guide edge 27 moves increasingly away from the opening 28. The smallest distance between the cutting head 11 and the internal corner is reached when the contact between the footplate 4 and the projecting part of the lock seam wanders towards the opening 28.

Through a corresponding selection of the rotational sense of the milling cutter 9, the cutting force generates a reaction force, which presses the guide edge 27 against the projecting part of the lock seam, that is, the surface not to be processed. As can be seen from the approximately to-scale Figures, the contact point, i.e., the support point, on the edge 27 of the footplate 4 lies at not too large a distance from the cutting head 11. The worker thus has to compensate for only very small forces.

In the illustrated embodiment, the milling cutter 9 is a right-hand cut milling cutter. For a right-handed person, the projecting part of the car body lock seam would be next to the back of the right hand. For an upright lock seam, the tool would be pointed upwards. In the case of the reverse working direction, a left-hand cut milling cutter is used in connection with a footplate 4, which is the mirror image of illustrated footplate 4.

As will be understood by those skilled in the art, the guide edge is each part of the guide plate 4 that extends from the flat guide surface 25 upwards in the direction towards the rotary drive 2. In this way, internal corners can be processed.

Figure 3:
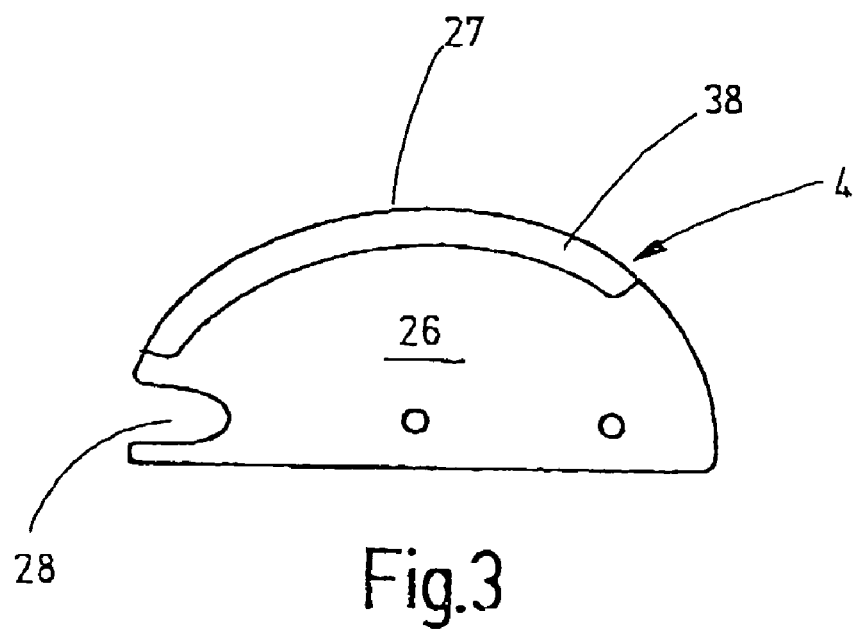
FIG. 3 is a top view of a footplate of the tool of FIG. 1.

FIG. 2 shows the footplate 4 in a top view. In FIG. 2, it can be seen that the guide edge begins at the fork-shaped opening 28 with a very large radius of curvature and merges into a small radius of curvature at the rear side of the guide plate 4 where the holder 3 is set. FIG. 3 shows another embodiment of a guide plate for milling in the internal corner area of a lock seam. In the FIG. 3 embodiment, the footplate 4 is defined by an edge that has a constant radius of curvature. Such a footplate is preferred when the weld seams are a relatively large distance from the internal corner of the lock seam. In addition, the top view of the footplate provided in FIG. 3 shows that the guide edge 27 is extended in height by a rim 38 set on the edge. In this way, it is possible to obtain a strong rounding at the transition from the contact surface 25 to the lateral guide edge 27. The rounding radius is advantageously larger than the largest rounding radius in the area of the internal corner of the car-body lock seam.

Figure 4:
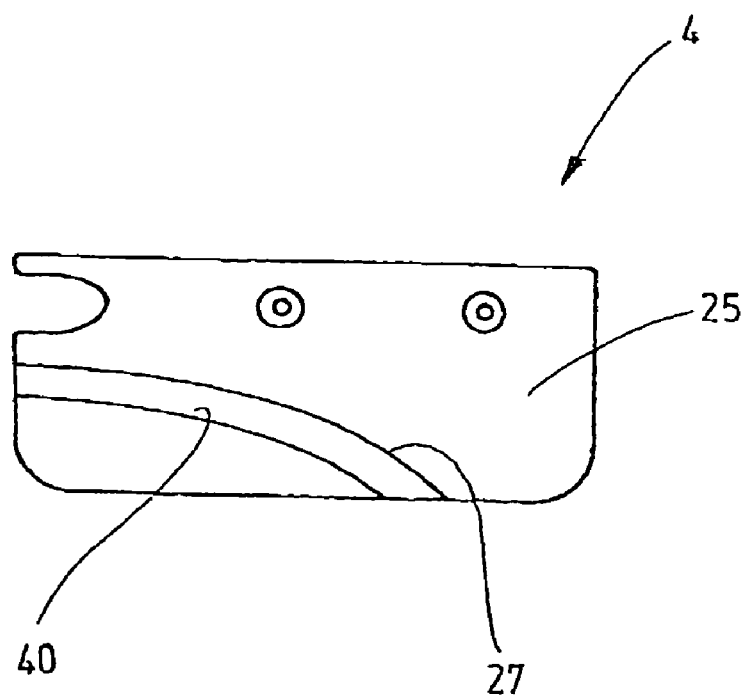
FIG. 4 is a top view of an alternative embodiment of a footplate of the tool of FIG. 1.

Finally, FIG. 4 is a schematic view of an embodiment of a footplate 4 that is designed for guiding the tool 1 on the free edge of the car-body joint. FIG. 4 shows the footplate 4 from the direction of the workpiece. The footplate 4 carries on its contact surface 25a curved crosspiece 40 that begins next to the opening 28 and moves away from the longitudinal axis of the footplate 4 with increasing distance from the opening 28. The longitudinal axis of the footplate 4 corresponds to the projection of the rotational axis 24 on the contact surface 25.

From FIG. 4, it can be seen that the guide edge 27 projects as a wall of the crosspiece 40 at a right angle downwards from the guide surface 25. The course is selected, starting from the forked opening 28, so that the distance from the free sheet edge to the cutting head increases the farther the contact point between the guide edge 27 and the free sheet edge wanders away from the milling cutter 9. In general, the guide edge 27 approximately follows an involute shape.

The penetration depth of the milling cutter 9 not only can be changed by moving the rotary drive 2 back and forth along the rotational axis 24, the angle of the rotational axis 24 to the contact surface can also be changed. For this purpose, the holder 3 receives a joint lying between the bore 14 and the footplate 4, whose axis runs perpendicular to the rotational axis 24.

A milling tool for opening laser-welded thin sheet metal joints is provided that has a rotary drive driving a milling cutter. The milling cutter projects with its head through an opening in a footplate, which forms a flat contact surface for fixing the penetration depth of the cutting head into the material. In addition, the footplate is provided with a lateral contact surface or contact edge, which introduces the reaction force generated by the cutting force into a contact surface of the car-body section to be processed directly and on short paths.

The invention claimed is:

1. A hand-operated tool for opening weld seams on thin sheet metal parts comprising:
   a rotary drive having a chuck for holding a milling cutter that is rotatable about a rotational axis by the rotary drive, the milling cutter producing a cutting force; and
   a footplate having a footplate contact surface and a guide edge, the footplate contact surface being inclined relative to the rotational axis and the guide edge being offset relative to the rotational axis in the footplate contact surface;
   wherein the guide edge is a curved edge and confines the footplate laterally, the guide edge extending from the footplate contact surface to a side of the footplate adjacent the rotary drive and defining an edge configured for engaging a surface of a metal part in which a weld seam is being opened and thereby introducing a reaction force generated by the cutting force into the metal part surface.

2. The tool according to claim 1 wherein the footplate contact surface is a flat surface.

3. The tool according to claim 1 wherein the guide edge has a changing curvature.

4. The tool according to claim 1 wherein the rotational axis intersects a plane defined by the footplate contact surface.

5. The tool according to claim 1 wherein a projection of the footplate extends next to an engagement position of the milling cutter with the workpiece.

6. The tool according to claim 5 wherein the footplate includes an opening through which the milling cutter penetrates.

7. The tool according to claim 1 wherein the rotary drive is a compressed air motor or an electric motor.

8. The tool according to claim 7 wherein the casing is connected directly to the armature of the electric motor or to the rotor of the compressed air motor.

9. The tool according to claim 1 wherein the rotary drive has an attachment neck coaxial to the casing.

10. The tool according to claim 9 wherein the attachment neck is provided with an external thread.

11. The tool according to claim 1 wherein the rotary drive is adjustably connected to the footplate.

12. The tool according to claim 11 wherein the adjustable connection of the rotary drive to the footplate provides adjustability of an angle of the rotational axis relative to the contact surface.

13. The tool according to claim 11 wherein the adjustable connection of the rotary drive to the footplate provides adjustability of a position of the rotary drive in a direction parallel to the rotational axis.

14. The tool according to claim 1 wherein the rotary drive is connected to the footplate by means of a holder.

15. The tool according to claim 14 wherein the holder has a joint that can be fixed.

16. The tool according to claim 14 wherein the rotary drive has an attachment neck coaxial to the casing and the holder has an opening for holding the neck of the rotary drive.

17. A hand-operated tool for opening weld seams on thin sheet metal parts comprising:
a rotary drive having a chuck for holding a milling cutter that is rotatable about a rotational axis by the rotary drive, the milling cutter producing a cutting force; and
a footplate having a footplate contact surface and a guide edge, the footplate contact surface being inclined relative to the rotational axis and the guide edge being offset relative to the rotational axis in the footplate contact surface;
wherein the guide edge is a curved edge, the guide edge projecting from the contact surface in a direction that lies on the a side opposite the rotary drive;
wherein the guide edge begins close to the milling cutter and the distance between the guide edge and a longitudinal axis of the footplate increases along with the distance from the milling cutter, the guide edge defining an edge configured for engaging a surface of a metal part in which a weld seam is being opened and thereby introducing a reaction force generated by the cutting force into the metal part surface.

18. The tool according to claim 17 wherein the footplate contact surface is a flat surface.

19. The tool according to claim 17 wherein the guide edge has a changing curvature.

20. The tool according to claim 17 wherein the rotational axis intersects a plane defined by the footplate contact surface.

21. The tool according to claim 17 wherein a projection of the footplate extends next to an engagement position of the milling cutter with the workpiece.

22. The tool according to claim 21 wherein the footplate includes an opening through which the milling cutter penetrates.

23. The tool according to claim 17 wherein the rotary drive is a compressed air motor or an electric motor.

24. The tool according to claim 23 wherein the casing is connected directly to the armature of the electric motor or to the rotor of the compressed air motor.

25. The tool according to claim 17 wherein the rotary drive has an attachment neck coaxial to the casing.

26. The tool according to claim 25 wherein the attachment neck is provided with an external thread.

27. The tool according to claim 17 wherein the rotary drive is adjustably connected to the footplate.

28. The tool according to claim 27 wherein the adjustable connection of the rotary drive to the footplate provides adjustability of an angle of the rotational axis relative to the contact surface.

29. The tool according to claim 27 wherein the adjustable connection of the rotary drive to the footplate provides adjustability of a position of the rotary drive in a direction parallel to the rotational axis.

30. The tool according to claim 17 wherein the rotary drive is connected to the footplate by means of a holder.

31. The tool according to claim 30 wherein the holder has a joint that can be fixed.

32. The tool according to claim 30 wherein the rotary drive has an attachment neck coaxial to the casing and the holder has an opening for holding the neck of the rotary drive.

* * * * *